United States Patent
Jang et al.

(10) Patent No.: US 12,061,157 B1
(45) Date of Patent: Aug. 13, 2024

(54) BATTERY HOLDER DEVICE AND BATTERY TEST SYSTEM INCLUDING THE SAME

(71) Applicant: SK ON CO., LTD., Seoul (KR)

(72) Inventors: Hye Ju Jang, Daejeon (KR); Dong Whan Shin, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/586,558

(22) Filed: Feb. 26, 2024

(30) Foreign Application Priority Data

Mar. 24, 2023 (KR) .......................... 10-2023-0038781
Dec. 27, 2023 (KR) .......................... 10-2023-0192673

(51) Int. Cl.
*G01N 23/00* (2006.01)
*G01N 23/046* (2018.01)

(52) U.S. Cl.
CPC ..... *G01N 23/046* (2013.01); *G01N 2223/309* (2013.01); *G01N 2223/3306* (2013.01); *G01N 2223/611* (2013.01)

(58) Field of Classification Search
CPC ........... G01N 23/046; G01N 2223/309; G01N 2223/3306; G01N 2223/611
See application file for complete search history.

(56) References Cited

U.S. PATENT DOCUMENTS

2020/0150061 A1\* 5/2020 Kriele .............. G01N 23/20033

FOREIGN PATENT DOCUMENTS

KR 10-2461774 B1 11/2022

\* cited by examiner

*Primary Examiner* — Dani Fox
(74) *Attorney, Agent, or Firm* — IP & T GROUP LLP

(57) ABSTRACT

A battery holder device and a battery test system including the same are disclosed. The battery holder device and the battery test system including the same can grip battery calls and test the battery calls while rotating the gripped battery calls about two different axes. The battery holder device comprises a holder module including a holder housing forming a shape extending in a longitudinal direction and including a holder housing body, and a gripper movably coupled to the holder housing body. The holder housing body includes first and second holder housing body walls that are spaced apart from each other in the longitudinal direction of the holder housing and face each other, and a holder housing body bottom connecting the first and second holder housing body walls.

20 Claims, 7 Drawing Sheets

BATTERY HOLDER DEVICE AND BATTERY TEST SYSTEM INCLUDING THE SAME

CROSS-REFERENCE TO RELATED APPLICATIONS

This patent document claims the priority and benefits of Korean Patent Application Nos. 10-2023-0038781 and 10-2023-0192673, filed on Mar. 24, 2023 and Dec. 27, 2023, which is incorporated herein by reference in its entirety.

TECHNICAL FIELD

The technology and implementations disclosed in this patent document generally relate to a battery holder device and a battery test system including the same.

BACKGROUND

In order to test battery cells or jelly-rolls, a test device needs to test the battery cells or the jelly-rolls at various angles. To this end, it is necessary to rotate the battery cells or the jelly-rolls about a plurality of rotation axes in a state of gripping the battery cells or the jelly-rolls.

SUMMARY

The disclosed technology can be implemented in some embodiments to provide a battery holder device rotating battery cells or jelly-rolls at various angles and a battery test system including the same.

In one aspect of the disclosed technology, a battery holder device may comprise a holder module including a holder housing forming a shape extending in a longitudinal direction, the holder housing including a holder housing body, and a gripper movably coupled to the holder housing body, wherein the holder housing body may include a first holder housing body wall and a second holder housing body wall that are spaced apart from each other in the longitudinal direction of the holder housing and face each other, and a holder housing body bottom configured to connect the first holder housing body wall and the second holder housing body wall, wherein the holder housing may further include a first holder housing shaft extending from an outer face of the first holder housing body wall in the longitudinal direction of the holder housing, and a second holder housing shaft extending from an outer face of the second holder housing body wall in the longitudinal direction of the holder housing.

In another aspect of the disclosed technology, a battery test system may comprise a battery holder device and a test device including an X-ray source and an X-ray reaction unit that are disposed with the battery holder device therebetween, wherein the battery holder device may include a holder module including a holder housing forming a shape extending in a longitudinal direction, the holder housing including a holder housing body, and a gripper movably coupled to the holder housing body, wherein the holder housing body may include a first holder housing body wall and a second holder housing body wall that are spaced apart from each other in the longitudinal direction of the holder housing and face each other, and a holder housing body bottom configured to connect the first holder housing body wall and the second holder housing body wall, wherein the holder housing may further include a first holder housing shaft extending from an outer face of the first holder housing body wall in the longitudinal direction of the holder housing, and a second holder housing shaft extending from an outer face of the second holder housing body wall in the longitudinal direction of the holder housing.

According to an embodiment of the disclosed technology, a battery holder device rotating battery cells or jelly-rolls at various angles and a battery test system including the same can be provided.

A battery holder device and a battery test system including the same based on some embodiments of the disclosed technology can be widely applied in green technology fields such as electric vehicles, battery charging stations, and other battery-based solar power generation and wind power generation.

A battery holder device and a battery test system including the same based on some embodiments of the disclosed technology can be used in eco-friendly electric vehicles, hybrid vehicles, etc. to prevent climate change by suppressing air pollution and greenhouse gas emissions.

BRIEF DESCRIPTION OF THE DRAWINGS

The accompanying drawings illustrate examples of embodiments of various technical features disclosed in the disclosure.

DETAILED DESCRIPTION

Reference will now be made in detail to embodiments of the disclosed technology, examples of which are illustrated in the accompanying drawings. However, the following description is merely an example and does not intended to limit the disclosed technology to a specific implementation.

Figure 1:
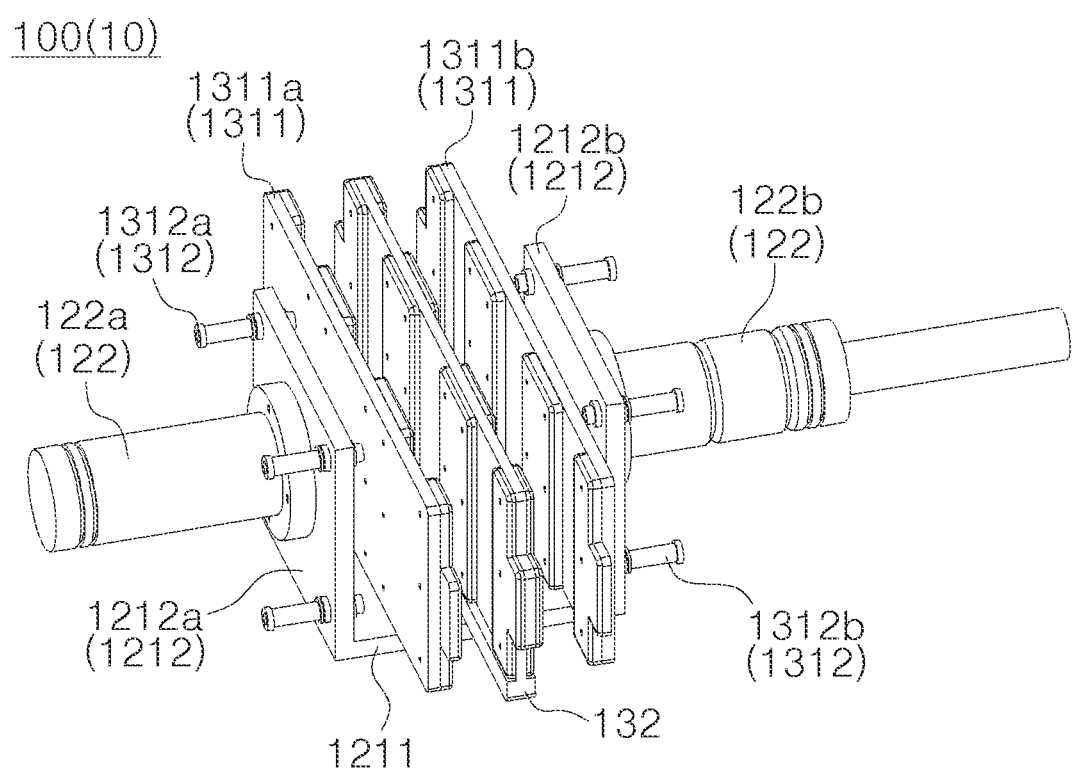
FIG. 1 illustrates a holder module based on an embodiment of the disclosed technology.

FIG. 1 illustrates a holder module based on an embodiment of the disclosed technology.

Referring to FIG. 1, a battery holder device 10 based on an embodiment of the disclosed technology may include a holder module 100. The holder module 100 may include a holder housing 120.

The holder housing 120 may include a holder housing body 121. The holder housing body 121 may form a space. The holder housing body 121 may accommodate a gripper 130. The holder housing body 121 may have rigidity.

The holder housing body 121 may include a holder housing body bottom 1211 and a holder housing body wall 1212. The holder housing body bottom 1211 may extend from an end and lead to another end.

For example, the holder housing body bottom 1211 may form a shape extending in a longitudinal direction of the holder housing 120. The holder housing body bottom 1211 may form the shape of a plate or board.

For example, the holder housing body bottom 1211 may form an upper face and a lower face. The upper face of the holder housing body bottom 1211 may be directed upward or face upward. The lower face of the holder housing body bottom 1211 may be directed downward or face downward.

The holder housing body 121 may include the holder housing body wall 1212. A plurality of holder housing body walls 1212 may be provided. For example, the holder housing body 121 may include a first holder housing body wall 1212*a* and a second holder housing body wall 1212*b*.

The holder housing body wall 1212 may include or indicate at least one of the first holder housing body wall 1212*a* or the second holder housing body wall 1212*b*.

The holder housing body wall 1212 may have a shape extending from the holder housing body bottom 1211. For example, the holder housing body wall 1212 may form a shape extending upward from the holder housing body bottom 1211.

For example, the first holder housing body wall 1212*a* may form a shape extending upward from the end of the holder housing body bottom 1211. For example, the second holder housing body wall 1212*b* may form a shape extending upward from the another end of the holder housing body bottom 1211.

The first holder housing body wall 1212*a* and the second holder housing body wall 1212*b* may face each other. For example, an inner face of the first holder housing body wall 1212*a* may face an inner face of the second holder housing body wall 1212*b*.

The first holder housing body wall 1212*a* and the second holder housing body wall 1212*b* may be positioned opposite to each other. For example, the first holder housing body wall 1212*a* and the second holder housing body wall 1212*b* may be disposed in the longitudinal direction of the holder housing 120.

The first holder housing body wall 1212*a*, the holder housing body bottom 1211, and the second holder housing body wall 1212*b* may be sequentially connected. The first holder housing body wall 1212*a*, the holder housing body bottom 1211, and the second holder housing body wall 1212*b* may be integrally formed.

The holder housing 120 may include a holder housing shaft 122. The holder housing shaft 122 may be connected or coupled or fixed to the holder housing body 121.

The holder housing shaft 122 may form a shape extending in its longitudinal direction. For example, the longitudinal direction of the holder housing shaft 122 may be the longitudinal direction of the holder housing 120.

A plurality of holder housing shafts 122 may be provided. For example, the holder housing 120 may include a first holder housing shaft 122*a* and a second holder housing shaft 122*b*. The holder housing shaft 122 may include or indicate at least one of the first holder housing shaft 122*a* or the second holder housing shaft 122*b*.

The first holder housing shaft 122*a* and the second holder housing shaft 122*b* may be coaxial. For example, an axis line of the first holder housing shaft 122*a* may be the same as an axis line of the second holder housing shaft 122*b*.

The first holder housing shaft 122*a* may protrude from an outer face of the first holder housing body wall 1212*a* to form an extended shape. The second holder housing shaft 122*b* may protrude from an outer face of the second holder housing body wall 1212*b* to form an extended shape.

The holder module 100 may include the gripper 130. The gripper 130 may be connected or coupled to the holder housing 120. The gripper 130 may grip a jelly-roll (not shown) or a battery cell (not shown). The jelly-roll (not shown) may include an electrode assembly constituting the battery cell (not shown).

The gripper 130 may include a pusher 131. The pusher 131 may be connected or coupled to the holder housing 120. For example, the pusher 131 may be connected or coupled to the holder housing body 121.

The pusher 131 may include a pusher plate 1311 and a pusher coupling part 1312. The pusher plate 1311 may face the holder housing body wall 1212. The pusher plate 1311 may be disposed between the first holder housing body wall 1212*a* and the second holder housing body wall 1212*b*. The pusher plate 1311 may be disposed on the holder housing body bottom 1211.

The pusher coupling part 1312 may couple the pusher plate 1311 and the holder housing body wall 1212. For example, the pusher plate 1311 may be coupled to the holder housing body wall 1212 through the pusher coupling part 1312.

A plurality of pusher plates 1311 may be provided. For example, the pusher 131 may include a first pusher plate 1311*a* and a second pusher plate 1311*b*. The pusher plate 1311 may include or indicate at least one of the first pusher plate 1311*a* or the second pusher plate 1311*b*.

A plurality of pusher coupling parts 1312 may be provided. For example, the pusher 131 may include a first pusher coupling part 1312*a* and a second pusher coupling part 1312*b*. The pusher coupling part 1312 may include or indicate at least one of the first pusher coupling part 1312*a* or the second pusher coupling part 1312*b*.

An outer face of the first pusher plate 1311*a* may face the inner face of the first holder housing body wall 1212*a*. An inner face of the first pusher plate 1311*a* may face an inner face of the second pusher plate 1311*b*. The first pusher plate 1311*a* may move with respect to the first holder housing body wall 1212*a*.

The first pusher coupling part 1312*a* may couple the first pusher plate 1311*a* and the first holder housing body wall 1212*a*. The first pusher coupling part 1312*a* may adjust a distance between the first pusher plate 1311*a* and the first holder housing body wall 1212*a*.

An outer face of the second pusher plate 1311*b* may face the inner face of the second holder housing body wall 1212*b*. The inner face of the second pusher plate 1311*b* may face the inner face of the first pusher plate 1311*a*. The second pusher plate 1311*b* may move with respect to the second holder housing body wall 1212*b*.

The second pusher coupling part 1312*b* may couple the second pusher plate 1311*b* and the second holder housing body wall 1212*b*. The second pusher coupling part 1312*b* may adjust a distance between the second pusher plate 1311*b* and the second holder housing body wall 1212*b*.

For another example, the pusher plate 1311 may be connected to the holder housing shaft 122 to receive a driving force from the holder housing shaft 122, thereby moving. For example, the pusher plate 1311 may be coupled to a rod (not shown) positioned in an inner hollow portion of the holder housing shaft 122.

For example, the first pusher plate 1311*a* may be connected to the first holder housing shaft 122*a* to receive a driving force from the first holder housing shaft 122*a*, thereby moving.

For example, the second pusher plate 1311*b* may be connected to the second holder housing shaft 122*b* to receive a driving force from the second holder housing shaft 122*b*, thereby moving.

The battery cell (not shown) may be mounted between the first pusher plate 1311a and the second pusher plate 1311b. The pusher coupling part 1312 may adjust a distance between the first pusher plate 1311a and the second pusher plate 1311b. Hence, the pusher plate 1311 can grip the battery cell (not shown).

The gripper 130 may include a partition 132. The partition 132 may be coupled to the holder housing body 121. For example, the partition 132 may form a shape extending upward from the upper face of the holder housing body bottom 1211. The partition 132 may be disposed between the first pusher plate 1311a and the second pusher plate 1311b.

The battery cell (not shown) may be disposed between the first pusher plate 1311a and the partition 132. When the first pusher plate 1311a moves and approaches the partition 132, the first pusher plate 1311a and the partition 132 may grip the battery cell (not shown).

The battery cell (not shown) may be disposed between the second pusher plate 1311b and the partition 132. When the second pusher plate 1311b moves and approaches the partition 132, the second pusher plate 1311b and the partition 132 may grip the battery cell (not shown).

A plurality of pushers 131 may be provided. For example, the gripper 130 may include a first pusher 131a and a second pusher 131b. The pusher 131 may include or indicate at least one of the first pusher 131a or the second pusher 131b.

The first pusher 131a may include the first pusher plate 1311a and the first pusher coupling part 1312a. The second pusher 131b may include the second pusher plate 1311b and the second pusher coupling part 1312b.

The first pusher 131a and the partition 132 may grip one battery cell (not shown), and the second pusher 131b and the partition 132 may grip one battery cell (not shown).

If there is no partition 132, the first pusher 131a and the second pusher 131b may grip one battery cell (not shown). In other words, if there is the partition 132, the gripper 130 may grip two battery cells (not shown), and if there is no partition 132, the gripper 130 may grip one battery cell (not shown).

Figure 2:
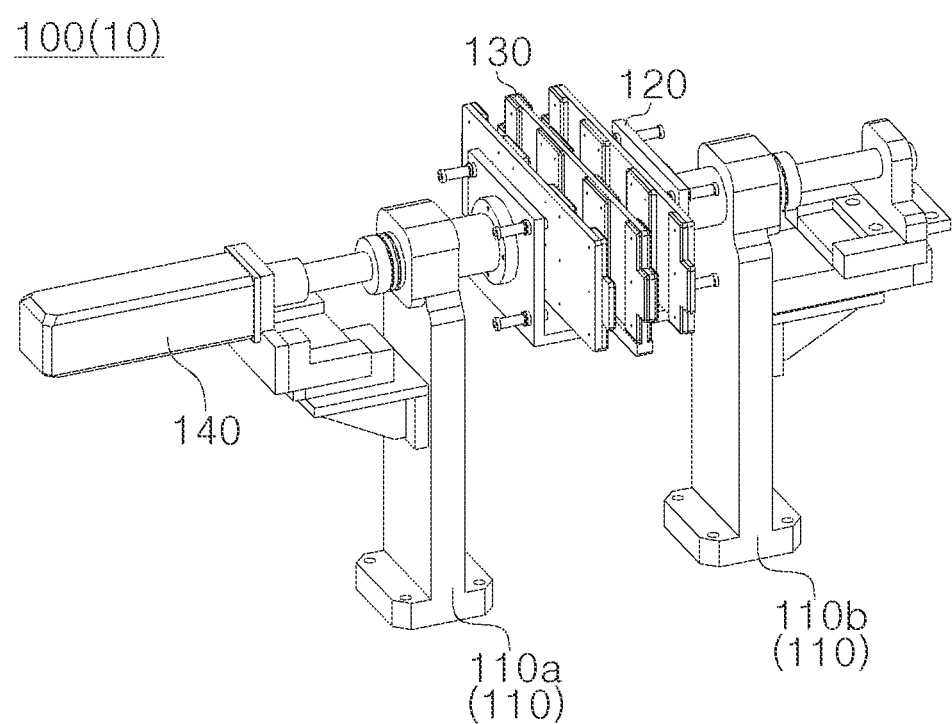
FIG. 2 illustrates a holder driver and a holder support included in the holder module illustrated in FIG. 1.

FIG. 2 illustrates a holder driver and a holder support included in the holder module illustrated in FIG. 1.

Referring to FIGS. 1 and 2, the holder module 100 may include a holder support 110. The holder support 110 may be coupled to the holder housing 120. For example, the holder support 110 may be coupled to the holder housing shaft 122.

For example, the holder housing shaft 122 may be rotatably coupled to the holder support 110. For example, the holder housing shaft 122 may be fitted and coupled to an opening or a groove formed in the holder support 110.

A plurality of holder supports 110 may be provided. For example, the holder module 100 may include a first holder support 110a and a second holder support 110b. The holder support 110 may include or indicate at least one of the first holder support 110a or the second holder support 110b. The holder housing body 121 may be disposed between the first holder support 110a and the second holder support 110b.

For example, the first holder housing shaft 122a may be rotatably coupled to the first holder support 110a. For example, the second holder housing shaft 122b may be rotatably coupled to the second holder support 110b.

The holder module 100 may include a holder driver 140. The holder driver 140 may be coupled to the holder housing shaft 122. For example, the holder driver 140 may be coupled to the first holder housing shaft 122a.

The holder driver 140 may provide a rotational force to the holder housing shaft 122. The longitudinal direction of the holder housing shaft 122 may be a roll axis. The holder housing shaft 122 can perform a roll rotation.

For example, the longitudinal direction of the holder housing shaft 122 may be parallel to a horizontal plane. For example, the longitudinal direction of the holder housing shaft 122 may be a front-rear direction.

Figure 3:
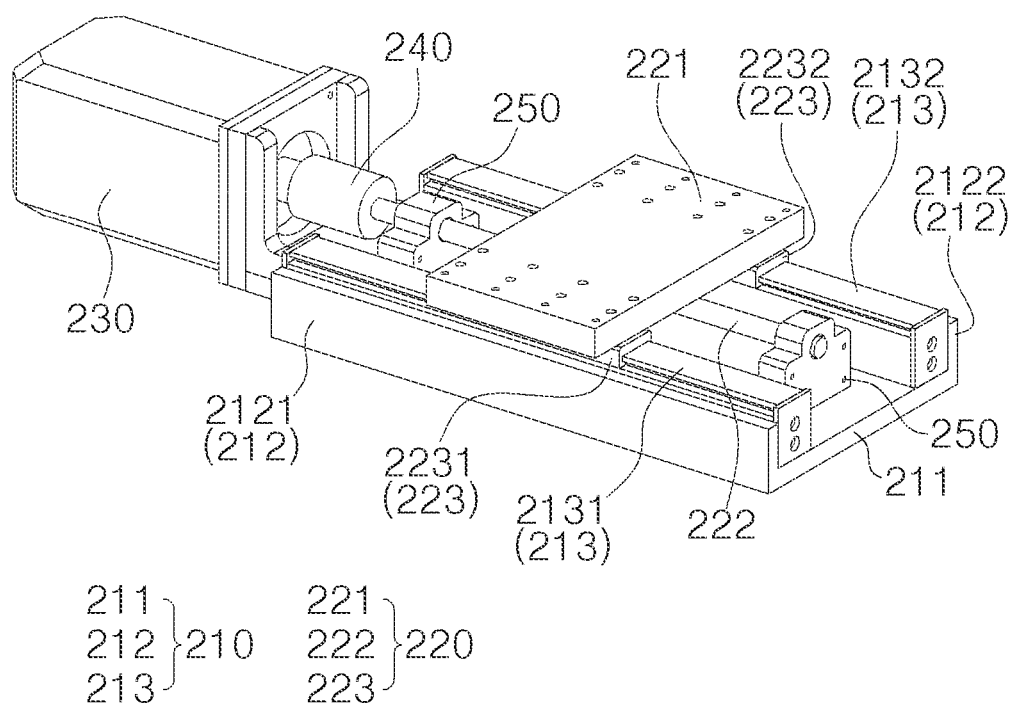
FIG. 3 illustrates a mover module based on an embodiment of the disclosed technology.

FIG. 3 illustrates a mover module based on an embodiment of the disclosed technology.

Referring to FIG. 3, the battery holder device 10 may include a mover module 200. The mover module 200 may include a mover housing 210.

The mover housing 210 may form an internal space. For example, the internal space formed by the mover housing 210 may be opened in a longitudinal direction of the mover housing 210. For example, the internal space formed by the mover housing 210 may be opened forward and backward. For example, the internal space formed by the mover housing 210 may be opened upward.

The mover housing 210 may include a mover housing bottom 211. The mover housing bottom 211 may extend from an end and lead to another end. For example, the mover housing bottom 211 may extend rearward from a front end and lead to a rear end.

For example, the mover housing bottom 211 may form a shape extending in the longitudinal direction of the mover housing 210. The mover housing bottom 211 may form the shape of a plate or board.

For example, the mover housing bottom 211 may form an upper face and a lower face.

The upper face of the mover housing bottom 211 may be directed upward or face upward. The lower face of the mover housing bottom 211 may be directed downward or face downward.

The mover housing 210 may include a mover housing wall 212. A plurality of mover housing walls 212 may be provided. For example, the mover housing 210 may include a first mover housing wall 2121 and a second mover housing wall 2122. The mover housing wall 212 may include or indicate at least one of the first mover housing wall 2121 or the second mover housing wall 2122.

The mover housing wall 212 may form a shape extending from the mover housing bottom 211. For example, the mover housing wall 212 may form a shape extending upward from the mover housing bottom 211.

For example, the first mover housing wall 2121 may form a shape extending upward from an end of the mover housing bottom 211. For example, the second mover housing wall 2122 may form a shape extending upward from the another end of the mover housing bottom 211. The mover housing wall 212 may extend rearward from a front end and lead to a rear end.

The first mover housing wall 2121 and the second mover housing wall 2122 may face each other. For example, an inner face of the first mover housing wall 2121 may face an inner face of the second mover housing wall 2122.

The first mover housing wall 2121 and the second mover housing wall 2122 may be positioned opposite to each other. For example, the first mover housing wall 2121 and the second mover housing wall 2122 may be disposed in a width direction of the mover housing 210.

The mover housing 210 may include a mover housing rail 213. The mover housing rail 213 may be formed on or coupled to the mover housing wall 212. For example, the mover housing rail 213 may be a groove or a protrusion formed on the mover housing wall 212.

A plurality of mover housing rails 213 may be provided. For example, the mover housing 210 may include a first mover housing rail 2131 and a second mover housing rail 2132. The mover housing rail 213 may include or indicate at least one of the first mover housing rail 2131 or the second mover housing rail 2132.

The mover housing rail 213 may form a shape extending in the longitudinal direction of the mover housing 210. For example, a longitudinal direction of the mover housing rail 213 may be the longitudinal direction of the mover housing 210. For example, the longitudinal direction of the mover housing rail 213 may be the front-rear direction.

The first mover housing rail 2131 may be formed on or coupled to the first mover housing wall 2121. The second mover housing rail 2132 may be formed on or coupled to the second mover housing wall 2122.

The first mover housing rail 2131 and the second mover housing rail 2132 may be disposed parallel to each other. For example, the first mover housing rail 2131 and the second mover housing rail 2132 may be parallel to each other.

The mover module 200 may include a mover mount 220. The mover mount 220 may include a mover mount stand 221. The mover mount stand 221 may be positioned on the mover housing 210. A part of the mover mount stand 221 may be omitted in FIG. 3 for convenience of explanation.

The mover mount stand 221 may form the shape of a plate or board. A lower face of the mover mount stand 221 may face the mover housing 210.

The mover mount 220 may include a mover mount power receiving unit 222. The mover mount power receiving unit 222 may be coupled or fixed to the mover mount stand 221.

The mover mount power receiving unit 222 may be positioned below the mover mount stand 221. The mover mount power receiving unit 222 may be positioned on the mover housing bottom 211. The mover mount power receiving unit 222 may be positioned between the first mover housing wall 2121 and the second mover housing wall 2122.

The mover mount power receiving unit 222 may form a shape extending in its longitudinal direction. For example, the longitudinal direction of the mover mount power receiving unit 222 may be parallel to the longitudinal direction of the mover housing 210.

The mover mount power receiving unit 222 may form the shape of a pipe. For example, the mover mount power receiving unit 222 may form a hollow portion therein. For example, threads may be formed on an inner face of the mover mount power receiving unit 222.

The mover mount 220 may include a mover mount guide 223. The mover mount guide 223 may be connected or coupled to the mover mount stand 221. For example, the mover mount guide 223 may form a shape extending from the mover mount stand 221.

The mover mount guide 223 may form a shape extending in its longitudinal direction. The longitudinal direction of the mover mount guide 223 may be parallel to the longitudinal direction of the mover housing rail 213. The longitudinal direction of the mover mount guide 223 may be parallel to the longitudinal direction of the mover mount power receiving unit 222.

The mover mount guide 223 may be coupled to the mover housing wall 212. For example, the mover mount guide 223 may be movably coupled to the mover housing wall 212. For example, the mover mount guide 223 may be movably coupled to the mover housing rail 213.

A plurality of mover mount guides 223 may be provided. For example, the mover mount 220 may include a first mover mount guide 2231 and a second mover mount guide 2232. The mover mount guide 223 may include or indicate at least one of the first mover mount guide 2231 or the second mover mount guide 2232.

The first mover mount guide 2231 may be movably coupled to the first mover housing rail 2131. The second mover mount guide 2232 may be movably coupled to the second mover housing rail 2132.

The mover module 200 may include a mover mount power reception support unit 250. The mover mount power reception support unit 250 may be coupled or fixed to the upper face of the mover housing bottom 211.

The mover mount power reception support unit 250 may support the mover mount power receiving unit 222. For example, the mover mount power receiving unit 222 may be movably coupled to the mover mount power reception support unit 250.

For example, the mover mount power reception support unit 250 may form a hole or an opening. The mover mount power receiving unit 222 may be inserted into the hole or the opening formed in the mover mount power reception support unit 250.

The mover module 200 may include a mover shaft 240. The mover shaft 240 may form a shape extending in its longitudinal direction. For example, the longitudinal direction of the mover shaft 240 may be parallel to the longitudinal direction of the mover mount power receiving unit 222.

The mover shaft 240 may be coupled to the mover mount power receiving unit 222. For example, threads formed on an outer face of the mover shaft 240 may be coupled to the threads formed on the inner face of the mover mount power receiving unit 222.

The mover shaft 240 may rotate. When the mover shaft 240 rotates, the mover mount power receiving unit 222 may receive a rotational force. When the mover mount power receiving unit 222 receives the rotational force, the mover mount power receiving unit 222 may move in the front-rear direction.

The mover module 200 may include a mover driver 230. The mover driver 230 may be coupled to the mover shaft 240. The mover driver 230 may provide a rotational force to the mover shaft 240. For example, the mover driver 230 may include a motor.

Figure 4:
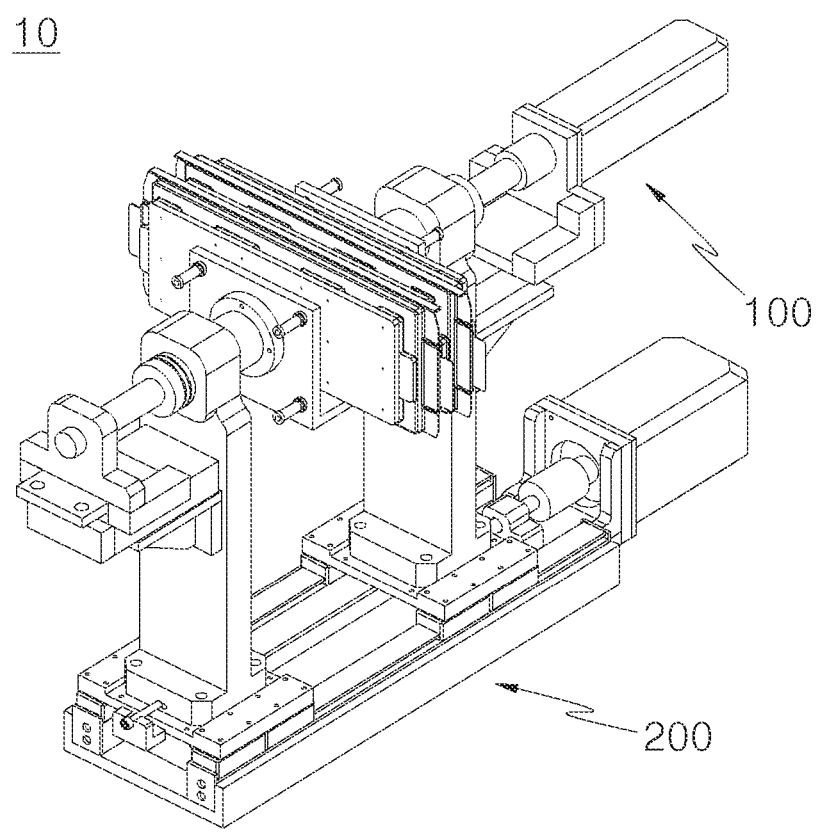
FIG. 4 illustrates that the holder module illustrated in FIG. 2 is coupled to the mover module illustrated in FIG. 3.

FIG. 4 illustrates that the holder module illustrated in FIG. 2 is coupled to the mover module illustrated in FIG. 3.

Referring to FIGS. 1 to 4, the holder module 100 may be coupled to the mover module 200. For example, a lower end of the holder support 110 may be coupled or fixed to an upper face of the mover mount stand 221.

When the mover mount stand 221 moves, the holder module 100 may move. Therefore, when the mover mount stand 221 moves back and forth, the battery cell (not shown) gripped by the holder module 100 may move back and forth.

Figure 5:
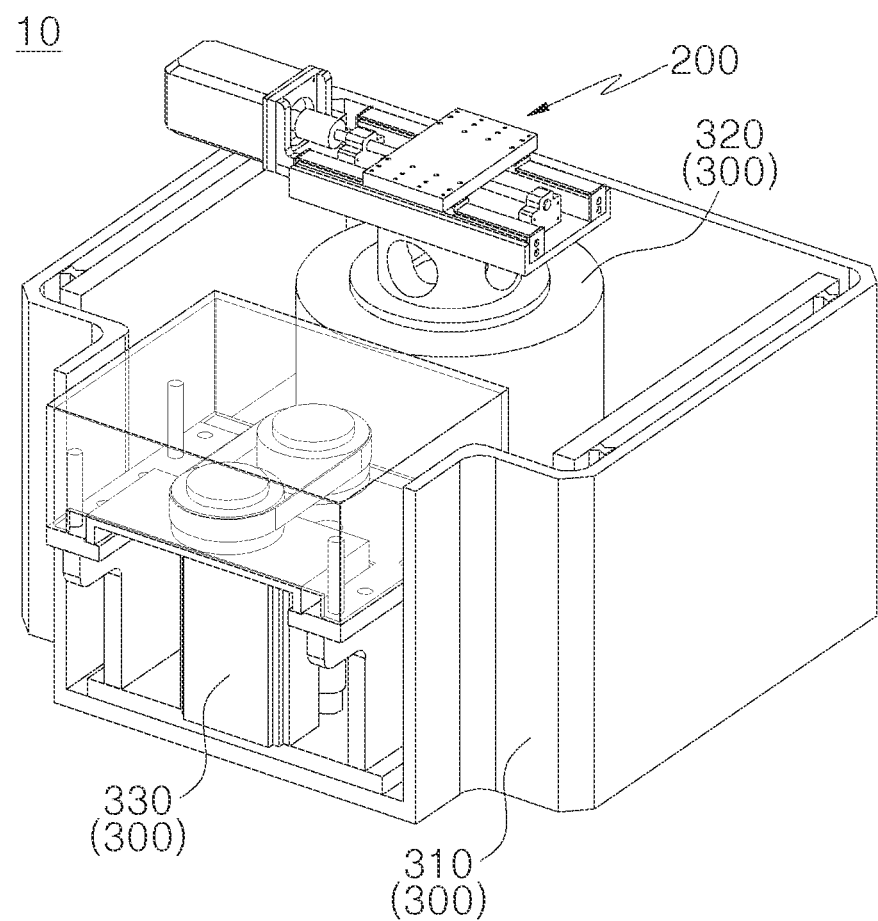
FIG. 5 illustrates that the mover module illustrated in FIG. 3 is coupled to a base module based on an embodiment of the disclosed technology.

FIG. 5 illustrates that the mover module illustrated in FIG. 3 is coupled to a base module based on an embodiment of the disclosed technology.

Referring to FIG. 5, the battery holder device 10 may include a base module 300. The base module 300 may include a base housing 310. The base housing 310 may form a space therein. The space formed in the base housing 310 may be opened upward.

The base module 300 may include a base rotating part 320. The base rotating part 320 may be accommodated in or coupled to the base housing 310. The base rotating part 320 may generate a rotational force.

The base rotating part 320 may be coupled to the mover module 200. For example, an upper end of the base rotating part 320 may be coupled to a lower end of the mover module 200.

The base rotating part 320 may provide the rotational force to the mover module 200. For example, the yaw axis may be parallel to an up-down direction. The base rotating part 320 may provide a yaw rotation to the mover module 200.

The yaw axis may intersect the roll axis. For example, the roll axis may be perpendicular to the roll axis. The yaw axis may move in parallel. The yaw axis, which has moved in parallel, may intersect the roll axis. For example, the yaw axis, which has moved in parallel, may be perpendicular to the roll axis.

The base module 300 may include a base driver 330. The base driver 330 may be accommodated in or coupled to the base housing 310. The base driver 330 may provide the rotational force to the base rotating part 320.

Figure 6:
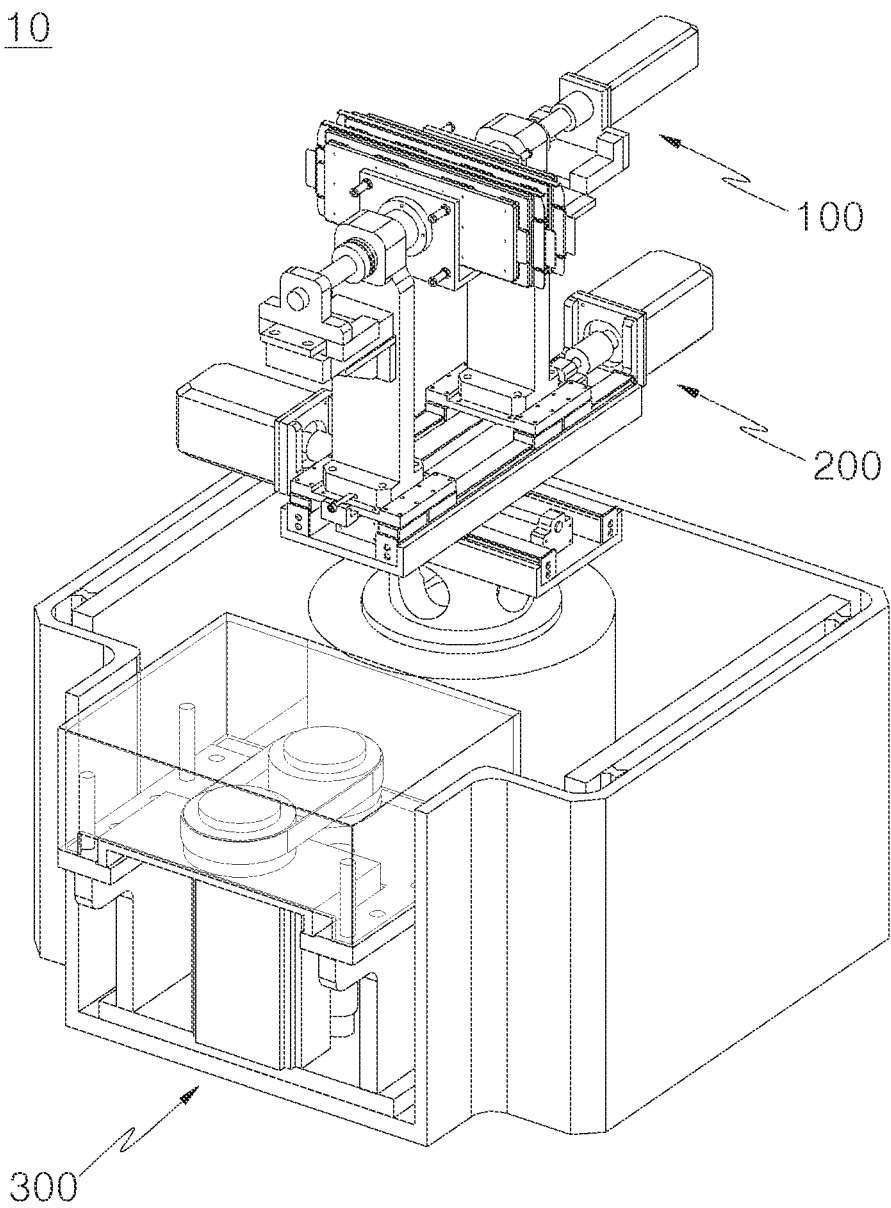
FIG. 6 illustrates that the holder module illustrated in FIG. 2 is coupled to the base module and the mover module illustrated in FIG. 5.

FIG. 6 illustrates that the holder module illustrated in FIG. 2 is coupled to the base module and the mover module illustrated in FIG. 5.

Referring to FIGS. 1 to 6, in a state where the holder module 100 grips the battery cell (not shown), the battery cell (not shown) may perform a translational movement and a rotational movement by the battery holder device 10.

For example, when the mover mount stand 221 performs the translational movement, the holder module 100 gripping the battery cell (not shown) may perform the translational movement.

For example, when the holder housing shaft 122 performs the roll rotation, the gripper 130 gripping the battery cell (not shown) may perform the roll rotation. For example, when the base rotating part 320 performs a yaw rotation, the gripper 130 gripping the battery cell (not shown) may performs the yaw rotation. Hence, a position of the battery cell (not shown) to be measured can be adjusted by a test device 20 (see FIG. 7).

Figure 7:
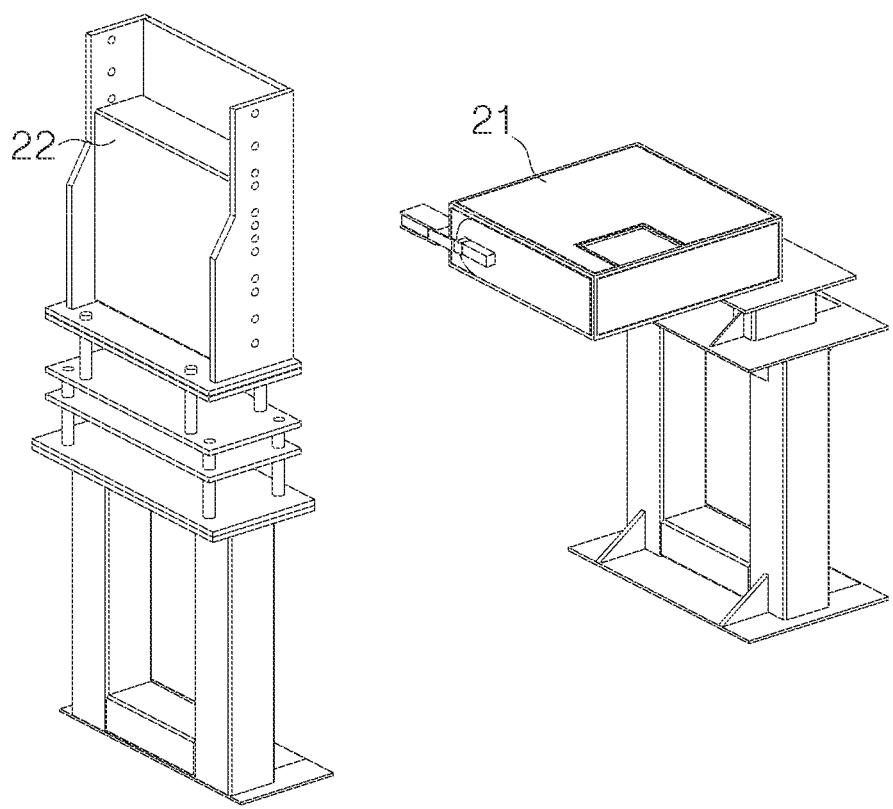
FIG. 7 illustrates a test device based on an embodiment of the disclosed technology.

FIG. 7 illustrates a test device based on an embodiment of the disclosed technology.

Referring to FIG. 7, the test device 20 may include an X-ray source 21. The X-ray source 21 may generate X-rays. For example, the X-ray source 21 may emit the X-rays in one direction.

The test device 20 may include an X-ray reaction unit 22. The X-ray reaction unit 22 may be positioned opposite the X-ray source 21. For example, the battery holder device 10 (see FIG. 6) may be positioned between the X-ray source 21 and the X-ray reaction unit 22. The X-ray reaction unit 22 may detect the X-rays incident on the X-ray reaction unit 22.

The X-ray source 21 may emit the X-rays toward the X-ray reaction unit 22. A portion of the X-rays emitted from the X-ray source 21 may be incident on the battery cells (not shown) gripped by the battery holder device 10 (see FIG. 6).

The gripper 130 (see FIG. 2) gripping the battery cells (not shown) may perform at least one of the roll rotation or the yaw rotation. Hence, a battery test system 1 (see FIG. 8) can obtain computed tomography (CT) information about at least a portion of the battery cells (not shown).

Figure 8:
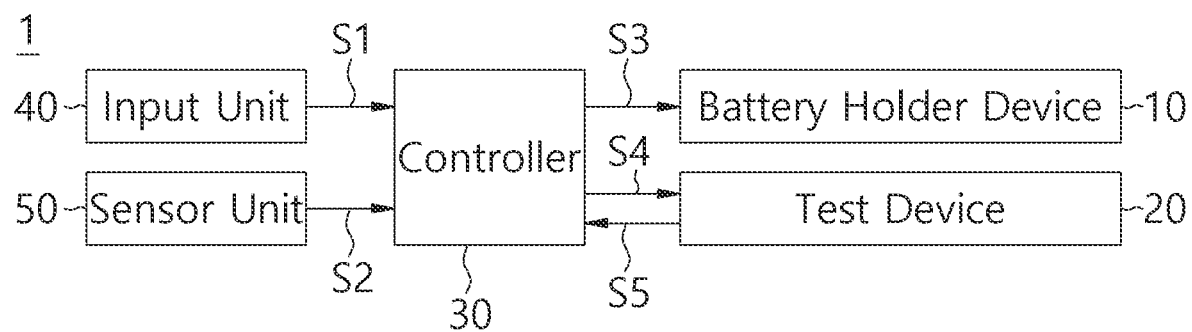
FIG. 8 illustrates a block diagram of a battery test system based on an embodiment of the disclosed technology.

FIG. 8 illustrates a block diagram of a battery test system based on an embodiment of the disclosed technology.

Referring to FIG. 8, the battery test system 1 may include a controller 30. The controller 30 may process signals. The controller 30 may perform calculations.

The battery test system 1 may include an input unit 40. The input unit 40 may obtain an input from a user, etc. The input obtained by the input unit 40 may include information on an operation of at least one of the battery holder device 10 or the test device 20.

The input unit 40 may generate a first signal S1. The input unit 40 may transmit the first signal S1 to the controller 30. The first signal S1 may include information on the input obtained by the input unit 40.

The battery test system 1 may include a sensor unit 50. The sensor unit 50 may be connected or coupled to the battery holder device 10. The sensor unit 50 may measure a position or posture of the battery cell (not shown) gripped by the battery holder device 10.

The sensor unit 50 may generate a second signal S2. The sensor unit 50 may transmit the second signal S2 to the controller 30. The second signal S2 may include information on values or images measured by the sensor unit 50.

The controller 30 may generate output signals S3 and S4 based on the input signals S1 and S2. For example, the controller 30 may input the input signals S1 and S2 to a specific algorithm to generate the output signals S3 and S4.

The input signals S1 and S2 may include or indicate at least one of the first signal S1 or the second signal S2. The output signals S3 and S4 may include or indicate at least one of the third signal S3 or the fourth signal S4.

The battery test system 1 may include the battery holder device 10. The battery holder device 10 may receive the third signal S3 from the controller 30. The battery holder device 10 may operate in response to the third signal S3.

The battery test system 1 may include the test device 20. The test device 20 may receive the fourth signal S4 from the controller 30. The test device 20 may operate in response to the fourth signal S4.

The test device 20 may generate a fifth signal S5. The fifth signal S5 may include information on values or images obtained from the X-ray reaction unit 22 (see FIG. 7).

The controller 30 may receive the fifth signal S5 from the test device 20. The controller 30 may generate an image of the battery cell (not shown) gripped by the battery holder device 10 based on the fifth signal S5.

Referring to FIGS. 1 to 8, the holder module 100, the mover module 200, and the base module 300 may be sequentially coupled. For example, an upper end of the mover module 200 may be coupled to the holder module 100, and the lower end of the mover module 200 may be coupled to the base module 300.

As another example, the battery holder device 10 may include the holder module 100 and the base module 300. For example, a lower end of the holder module 100 may be coupled to an upper end of the base module 300.

For example, the first holder support 110*a* and the second holder support 110*b* may be coupled to the base rotating part 320. That is, the base module 300 may directly provide the rotational force to the holder module 100.

Only specific examples of implementations of certain embodiments are described. Variations, improvements and enhancements of the disclosed embodiments and other embodiments may be made based on the disclosure of this patent document.

What is claimed is:

1. A battery holder device comprising:
   a holder module including:
   a holder housing forming a shape extending in a longitudinal direction, the holder housing including a holder housing body; and
   a gripper movably coupled to the holder housing body, wherein the holder housing body includes:
   a first holder housing body wall and a second holder housing body wall that are spaced apart from each other in the longitudinal direction of the holder housing and face each other; and
   a holder housing body bottom configured to connect the first holder housing body wall and the second holder housing body wall,
   wherein the holder housing further includes:
   a first holder housing shaft extending from an outer face of the first holder housing body wall in the longitudinal direction of the holder housing; and
   a second holder housing shaft extending from an outer face of the second holder housing body wall in the longitudinal direction of the holder housing.

2. The battery holder device of claim 1, wherein the holder module further includes a holder driver coupled to at least one of the first holder housing shaft or the second holder housing shaft, the holder driver configured to provide a rotational force.

3. The battery holder device of claim 2, wherein the holder module further includes:
   a first holder support configured to rotatably support the first holder housing shaft; and
   a second holder support configured to rotatably support the second holder housing shaft.

4. The battery holder device of claim 3, further comprising:
   a mover module including:
   a mover housing forming an internal space opened forward, backward, and upward: and
   a mover mount coupled to the mover housing movably back and forth, the mover mount being positioned above the internal space,
   wherein the first holder support and the second holder support are coupled to an upper face of the mover mount.

5. The battery holder device of claim 4, wherein the mover module further includes:
   a mover driver coupled to the mover housing;
   a mover shaft connected to the mover driver; and
   a mover mount power reception support unit coupled to the mover housing and configured to support the mover mount.

6. The battery holder device of claim 5, wherein the mover mount includes:
   a mover mount stand forming the upper face of the mover mount and coupled to the first holder support and the second holder support; and
   a mover mount power receiving unit coupled to the mover shaft, rotatably supported by the mover mount power reception support unit, and fixed to the mover mount stand.

7. The battery holder device of claim 6, wherein the mover mount power receiving unit forms a shape extending forward and rearward and accommodates the mover shaft, and wherein a thread formed on an outer face of the mover shaft is coupled to a thread formed on an inner face of the mover mount power receiving unit.

8. The battery holder device of claim 4, further comprising:
   a base module coupled to a lower face of the mover housing, the base module including:
   a base housing; and
   a base rotating part fixed to the base housing, the base rotating part being coupled to the mover housing to provide a rotational force to the mover housing.

9. The battery holder device of claim 8, wherein the mover module is coupled to the base rotating part that enables a yaw rotation using an up-down direction as a yaw axis.

10. The battery holder device of claim 9, wherein the holder housing body is coupled to the first holder support and the second holder support that enable a roll rotation using the longitudinal direction of the holder housing as a roll axis.

11. The battery holder device of claim 10, wherein the roll axis intersects the yaw axis, or moves in parallel to intersect the yaw axis.

12. The battery holder device of claim 1, wherein the gripper includes a first pusher and a second pusher,
   wherein the first pusher includes:
   a first pusher plate accommodated in the holder housing body and facing the first holder housing body wall; and
   a first pusher coupling part configured to connect the first holder housing body wall and the first pusher plate,
   wherein the second pusher includes:
   a second pusher plate accommodated in the holder housing body and facing the second holder housing body wall; and
   a second pusher coupling part configured to connect the second holder housing body wall and the second pusher plate.

13. The battery holder device of claim 12, wherein the first pusher coupling part adjusts an interval between the first pusher plate and the first holder housing body wall, and
   wherein the second pusher coupling part adjusts an interval between the second pusher plate and the second holder housing body wall.

14. The battery holder device of claim 12, wherein the gripper further includes a partition that is coupled to the holder housing body bottom and is positioned between the first pusher and the second pusher.

15. The battery holder device of claim 3, further comprising:
   a base module coupled to the holder module, the base module including:
   a base housing; and
   a base rotating part fixed to the base housing, the base rotating part being coupled to the holder module to provide a rotational force to the holder module.

16. The battery holder device of claim 15, wherein the first holder support and the second holder support are coupled to the base rotating part that enables a yaw rotation using an up-down direction as a yaw axis.

17. The battery holder device of claim 16, wherein the holder housing body is coupled to the first holder support and the second holder support that enable a roll rotation using the longitudinal direction of the holder housing as a roll axis.

18. The battery holder device of claim 17, wherein the roll axis intersects the yaw axis, or moves in parallel to intersect the yaw axis.

19. A battery test system comprising:

a battery holder device; and a test device including an X-ray source and an X-ray reaction unit that are disposed with the battery holder device therebetween, wherein the battery holder device includes a holder module, wherein the holder module includes:

a holder housing forming a shape extending in a longitudinal direction, the holder housing including a holder housing body; and a gripper movably coupled to the holder housing body, wherein the holder housing body includes:

a first holder housing body wall and a second holder housing body wall that are spaced apart from each other in the longitudinal direction of the holder housing and face each other; and a holder housing body bottom configured to connect the first holder housing body wall and the second holder housing body wall, wherein the holder housing further includes:

a first holder housing shaft extending from an outer face of the first holder housing body wall in the longitudinal direction of the holder housing; and a second holder housing shaft extending from an outer face of the second holder housing body wall in the longitudinal direction of the holder housing.

20. The battery test system of claim 19, wherein the X-ray source emits X-rays toward the X-ray reaction unit, and wherein the X-ray reaction unit detects the X-rays incident on the X-ray reaction unit.

\* \* \* \* \*